(12) United States Patent
Wahlström (10) Patent No.: US 11,753,982 B2
(45) Date of Patent: Sep. 12, 2023

(54) METHOD FOR REPLACING AN EXHAUST AFTERTREATMENT COMPONENT

(71) Applicant: VOLVO TRUCK CORPORATION, Gothenburg (SE)

(72) Inventor: Gert-Ove Wahlström, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/577,108

(22) Filed: Jan. 17, 2022

(65) Prior Publication Data

US 2022/0235691 A1    Jul. 28, 2022

(30) Foreign Application Priority Data

Jan. 22, 2021    (EP) ................................... 21152928

(51) Int. Cl.
*F01N 13/18*    (2010.01)
*B01D 46/82*    (2022.01)
(Continued)

(52) U.S. Cl.
CPC .......... *F01N 13/1888* (2013.01); *B01D 46/82* (2022.01); *B01D 53/94* (2013.01); *B01D 53/9431* (2013.01); *F01N 3/022* (2013.01); *F01N 3/0211* (2013.01); *F01N 3/2066* (2013.01); *F01N 3/281* (2013.01);
(Continued)

(58) Field of Classification Search
CPC combination set(s) only.
See application file for complete search history.

(56) References Cited

U.S. PATENT DOCUMENTS

2010/0024407 A1*  2/2010  Merchant ............. F01N 3/0211
                                                                  60/299
2010/0139256 A1    6/2010  DeCarolis
(Continued)

FOREIGN PATENT DOCUMENTS

EP    3757361 A1    12/2020
WO    WO 2020/074072 A1    4/2020
WO    WO 2020/218962 A1    10/2020

OTHER PUBLICATIONS

Extended European Search Report, European Patent Application No. 211529828.4, dated Jul. 26, 2021, 8 pages.

*Primary Examiner* — Binh Q Tran
(74) *Attorney, Agent, or Firm* — Sage Patent Group (57) ABSTRACT

The invention relates to a method for replacing an exhaust aftertreatment component of an exhaust aftertreatment system in a vehicle or vessel. The exhaust aftertreatment system is delimited by an outer casing and comprises a first sleeve, which extends in an axial direction and contains a first exhaust aftertreatment component mounted directly in the first sleeve. The method comprises the steps of:
  removing the first exhaust aftertreatment component from the first sleeve, the first sleeve thereby remaining intact within the outer casing,
  providing a second exhaust aftertreatment component being mounted in a second sleeve, the second sleeve being configured to fit within the first sleeve, and
  mounting the second sleeve with the second exhaust aftertreatment component in the first sleeve by inserting the second sleeve into the first sleeve in the axial direction thereof.

14 Claims, 4 Drawing Sheets

(51) Int. Cl.
  *B01D 53/94* (2006.01)
  *F01N 3/022* (2006.01)
  *F01N 3/20* (2006.01)
  *F01N 3/28* (2006.01)
  *F01N 3/021* (2006.01)
  *F01N 13/00* (2010.01)

(52) U.S. Cl.
  CPC .......... *F01N 3/2803* (2013.01); *F01N 3/2821* (2013.01); *F01N 3/2839* (2013.01); *F01N 13/009* (2014.06); *F01N 13/0097* (2014.06); *F01N 13/017* (2014.06); *F01N 13/18* (2013.01); *F01N 2330/30* (2013.01); *F01N 2450/02* (2013.01); *F01N 2450/22* (2013.01); *F01N 2450/24* (2013.01); *F01N 2450/30* (2013.01)

(56) References Cited

U.S. PATENT DOCUMENTS

| | | | | |
|---|---|---|---|---|
| 2011/0120085 | A1* | 5/2011 | Saito | F01N 13/1855 60/272 |
| 2011/0180344 | A1* | 7/2011 | Kimura | F01N 3/021 180/309 |
| 2013/0008528 | A1* | 1/2013 | Mitsuda | F01N 3/2839 137/343 |
| 2014/0154159 | A1* | 6/2014 | Rao | F01N 13/0097 423/212 |
| 2014/0308174 | A1* | 10/2014 | Doura | B01D 53/94 422/170 |
| 2016/0017778 | A1* | 1/2016 | Sandou | A01D 41/12 60/297 |

* cited by examiner

METHOD FOR REPLACING AN EXHAUST AFTERTREATMENT COMPONENT

This application claims foreign priority to European Patent Application No. 21152928.4, filed on Jan. 22, 2021, the disclosure and content of which is incorporated by reference herein in its entirety.

TECHNICAL FIELD

The invention relates to a method for replacing an exhaust aftertreatment component in an exhaust aftertreatment system of a vehicle or vessel. The invention also relates to an exhaust aftertreatment system of a vehicle or vessel. The invention further relates to a vehicle or vessel comprising the exhaust aftertreatment system.

The invention can be applied in medium-duty and heavy-duty vehicles, such as trucks and buses. Although the invention will be described with respect to a truck, the invention is not restricted to this particular vehicle, but may also be used in other vehicles such as buses, construction equipment and working machines. Examples of such vehicles are wheel loaders, articulated haulers, dump trucks, excavators, fire trucks, refrigerated trucks and backhoe loaders etc. The invention may also be applied in a vessel, e.g. a ship.

BACKGROUND

An exhaust aftertreatment system, abbreviated as EATS, is commonly used in the automotive field to reduce emissions from a combustion engine in order to comply with existing and upcoming emission legislations. EATS robustness and durability are becoming increasingly important to ensure compliance with such emission legislations. There is also more and more focus on the ability to re-use parts and minimize scrap.

Over the life time of a vehicle powered by a combustion engine, the EATS components are subjected to certain emission species that cause deactivation. The deactivation negatively affects properties such as NOx-conversion, filtering capacity and fuel consumption of the vehicle. A particular problem with deactivation is physical clogging of components, caused mainly by ash and soot from the combustion process.

Exhaust aftertreatment catalysts, for example catalysts for Selective Catalytic Reduction, SCR, may slowly lose their ability to reduce emissions over time due to thermal cycling and species in the exhausts that may block the active catalyst seats. Especially biofuels may contain catalyst poisons like potassium from fertilizers. Some of this ageing is irreversible and may finally lead to that the vehicle is no longer fulfilling the emission requirements and legislations.

For medium and heavy duty vehicles, such as trucks and buses, there are usually several types of exhaust aftertreatment components, such as catalysts and filters, combined in the EATS. Eventually, one aged exhaust aftertreatment component may lead to the need for replacing a complete exhaust aftertreatment system, which is a large and costly system.

Patent document US 2010/0139256 A1 discloses a method of replacing catalysts, particulate filters, retrofit of such components and similar, in all of their variants. The method comprises a step of removing the spent catalyst from the exhaust manifold, a step of cleaning the space and inserting the new component and a step of restoring the manifold portion. The method of US 2010/0139256 A1 comprises the step of cutting up the sheet that encloses the catalytic body, replacing the catalytic body and welding the cut part back.

The enclosed embodiments of US 2010/0139256 A1 show EATS configurations, where the sleeve holding the catalyst or filter also forms an outer casing of the EATS. This is for example often the case for cars. However, the EATS for medium-duty and heavy-duty vehicles are more complex, typically with many exhaust aftertreatment components within the same EATS. These are contained in sleeves which are separate from the outer casing of the EATS, e.g. by means of internal baffles. Further, the outer casing of the EATS for a medium-duty or heavy-duty vehicle commonly has a more complex structure than for a car, e.g. comprising an inner and outer steel casing with a heat insulating material in between. There may also be sections of the outer casing comprising acoustic dampening material. Hence, it is not feasible to access the exhaust aftertreatment component of a medium- or heavy-duty vehicle by opening the side wall of the outer casing of the EATS as disclosed by US 2010/0139256 A1.

It is therefore desirable to provide a solution for replacing one or more exhaust aftertreatment components, which do not function as intended any more, which solution is applicable also for more complex configurations of the EATS than for a car, such as the EATS of medium-duty and heavy-duty vehicles.

SUMMARY

An object of the invention is to provide an alternative or improved method for replacing an exhaust aftertreatment component of an exhaust aftertreatment system in a vehicle or vessel. The object is at least partly achieved by a method according to claim 1.

According to a first aspect of the invention, there is provided a method for replacing an exhaust aftertreatment component of an exhaust aftertreatment system in a vehicle or vessel, the exhaust aftertreatment system being delimited by an outer casing. The exhaust aftertreatment system comprises a first sleeve containing a first exhaust aftertreatment component mounted directly in the first sleeve. The first sleeve extends in an axial direction.

The method comprises the steps of:

S1: Removing the first exhaust aftertreatment component from the first sleeve, the first sleeve thereby remaining intact within the outer casing.

S2: Providing a second exhaust aftertreatment component being mounted in a second sleeve, the second sleeve being configured to fit within the first sleeve.

S3: Mounting the second sleeve with the second exhaust aftertreatment component in the first sleeve by inserting the second sleeve into the first sleeve in the axial direction thereof.

The first exhaust aftertreatment component, which does not function as intended any more and thus is desirable to replace may be a catalyst substrate, such as a Diesel Oxidation Catalyst substrate, abbreviated as DOC, or a Selective Catalytic Reduction substrate, abbreviated as SCR. As an alternative or a complement, the first exhaust aftertreatment component may be a Particulate Filter substrate, the Particulate Filter being adapted to remove particulate matter and/or soot from the type of fuel used by the engine. In the case of a diesel-powered combustion engine, the Particulate Filter substrate is a Diesel Particulate Filter substrate, abbreviated as DPF.

When mounted in a vehicle, the exhaust aftertreatment system, abbreviated as the EATS, forms part of an exhaust system, which extends from a combustion engine of the vehicle, optionally via an optional turbine of a turbocharger, through an exhaust inlet into the EATS and through a tailpipe provided downstream of the EATS, via which exhaust gas is emitted. Furthermore, as an option, there may be additional components, e.g. sensors, such as one or more temperature sensors or an optional urea injector. The EATS is delimited by an outer casing and the exhaust aftertreatment components, including the one to be replaced, are located within this outer casing, i.e. inside the walls of the outer casing. During operation of the combustion engine, the exhaust gas follows the exhaust flow path through the EATS, passing via the exhaust aftertreatment components within the EATS.

The outer casing forms a housing of the EATS and typically comprises a side wall, a front end cover and a rear end cover, the rear end cover being located opposite to the front end cover, with the rear end cover being closest to the tailpipe. Hence, the terms front end cover and rear end cover relate to the flow direction of the exhaust gas through the EATS, with front end being an inlet end and rear end being an outlet end of the EATS. The orientation of the EATS may differ from a longitudinal direction of the vehicle or vessel.

The method described herein discloses how to replace a first exhaust aftertreatment component being mounted directly in the first sleeve. The sleeve may also be called a casing or a canning. It extends in an axial direction from a first end to a second opposite end. The first and second ends thereby form opposite openings of the first sleeve. The first sleeve typically has a circular cross-section, although other cross-sections such as oval or elliptic, also would be feasible. The axial direction of the first sleeve often coincides with an axial direction of the EATS, but this is not a must, and the method may be performed for a first sleeve having an arbitrary orientation in relation to the axial direction of the EATS. The exhaust gas enters through one of the ends and leaves from the other end of the first sleeve when operating the EATS, i.e. it flows in the axial direction or at least substantially in the axial direction. The first exhaust aftertreatment component to be replaced is mounted directly in the first sleeve, meaning that there is no additional sleeve in between the first exhaust aftertreatment component and the first sleeve. There may however be a mounting mat located between the first exhaust aftertreatment component and the first sleeve.

In step S1, the first exhaust aftertreatment component is removed from the first sleeve. The first exhaust aftertreatment component is removed through one of the ends, such that the first sleeve remains intact after removal of the first exhaust aftertreatment component. Further, the first sleeve remains in its existing position in the EATS. This differs from some prior art methods, in which the first sleeve is removed together with the exhaust aftertreatment component it contains. It also differs from other prior art methods in which the first sleeve is manipulated in order to remove the first exhaust aftertreatment component, e.g. by making an opening in the side wall of the first sleeve.

The first sleeve may contain two or more first exhaust aftertreatment components, typically arranged axially in relation to each other. In that case, one or more of them may be removed.

Step S2 comprises providing a second exhaust aftertreatment component being mounted in a second sleeve. The second sleeve is configured to fit within the first sleeve. The second sleeve may e.g. have a diameter, which is slightly smaller than that of the first sleeve. The second exhaust aftertreatment component together with the second sleeve is intended to replace the first exhaust aftertreatment component.

The second sleeve contains the second exhaust aftertreatment component, which is to replace the first exhaust aftertreatment component removed in step S1. Since the second sleeve is adapted to fit within the first sleeve, the cross-sectional dimension of the second exhaust aftertreatment component is typically smaller than that of the first exhaust aftertreatment component, although the second exhaust aftertreatment component is configured to perform the corresponding function as the first exhaust aftertreatment component.

Steps S1 and S2 may be performed in any order, after each other and/or at least partly in parallel. Step S2 be performed fully separate from step S1, e.g. at another location and/or at another point of time. Step S3 is performed after steps S1 and S2.

In step S3, the second sleeve with the second exhaust aftertreatment component is mounted in the first sleeve by inserting the second sleeve into the first sleeve in the axial direction thereof, i.e. through the first end of the first sleeve.

In case the first sleeve contained two or more first exhaust aftertreatment components, two or more second exhaust aftertreatment components may be used to replace them. These may then be mounted axially in relation to each other in the second sleeve.

The method may be repeated a selectable number of times, either by replacing another first exhaust aftertreatment component than the one replaced the first time the method was performed or by taking the second exhaust aftertreatment component as a new first exhaust aftertreatment component when the method is repeated.

By applying the method, it is possible to replace an exhaust aftertreatment component of the EATS in a quick and/or cost-efficient way. Thereby, it may be possible to continue using an EATS also in case one of the exhaust aftertreatment components does not function as intended. Moreover, the method works well for EATS used in medium-duty and heavy-duty vehicles, which are more complex than EATS in cars, typically with many exhaust aftertreatment components within the same EATS. The method can be applied to existing EATS.

The method has the advantage that it works also for the case when the two or more second exhaust aftertreatment components have different cross-sectional dimensions, such as different diameters, since the circumference of the second sleeve can be locally adapted to the respective second exhaust aftertreatment component, so called adaptive canning of the second sleeve.

Step S1 may comprise cutting the first exhaust aftertreatment component in pieces, such as halves, when still located in the first sleeve. The cutting is made in a way leaving the first sleeve intact, e.g. by means of a rotating milling tool.

A mounting mat may be positioned between the second exhaust aftertreatment component and the second sleeve. The mounting mat is typically made of a resilient material and fills a gap between the second exhaust aftertreatment component and the second sleeve. The mounting mat can be used to compensate for dimension tolerances of the second exhaust aftertreatment component and/or the second sleeve. Further, the mounting mat prevents, or at least reduces the risk, of exhaust gas slipping through in the gap between the second exhaust aftertreatment component and the second sleeve, i.e. without passing the second exhaust aftertreatment component.

As an alternative to using a mounting mat, the second aftertreatment component may be mounted directly in the second sleeve, e.g. by welding. This may e.g. be the case for a metal catalyst substrate.

As mentioned above, two or more second exhaust aftertreatment components may be mounted in the same second sleeve. They can be used to replace two or more first aftertreatment components.

Step S3 may comprise positioning a support between the first sleeve and the second sleeve. The support reduces, or preferably avoids, the risk of the second sleeve vibrating or moving in any other way in the first sleeve. The support may, as a complement to, or as an alternative to its supportive function, have a sealing function, thereby preventing, or at least reducing the risk, of exhaust gas slipping through in the gap between the first sleeve and the second sleeve, i.e. without passing the second exhaust aftertreatment component. The support may comprise or be constituted by a gasket, such as a wire mesh gasket. The support may be located at or adjacent to the second end of the first sleeve, i.e. at the end being opposite to the end through which the second sleeve is inserted.

Step S3 may comprise welding the second sleeve to the first sleeve. The weld between the first and second sleeves prevents, or at least reduces the risk, of exhaust gas slipping through in the gap between the first and second sleeves, i.e. without passing the second exhaust aftertreatment component. The welding is typically made at or adjacent to the first end of the first sleeve, i.e. the end through which the second sleeve is inserted.

Step S3 may comprise adapting a circumference of the first sleeve at or adjacent to an end thereof to a circumference of the second sleeve at the corresponding location. Typically this is done at or adjacent to the first end, i.e. the end through which the second sleeve is inserted. Thereby a desired fit between the first sleeve and the second sleeve may be obtained. The adaptation of the circumference may be used to facilitate welding of the second sleeve to the first sleeve, e.g. by locally minimizing the gap between the first and the second sleeve. The adaptation of the circumference may be performed by calibrated expansion.

The method may further comprise the step of:

S0: Cutting open a piece of the outer casing of the exhaust aftertreatment system to allow access to the first aftertreatment component contained in the first sleeve.

This step is performed before step S1 to allow access to the first exhaust aftertreatment component in step S1, such that it can be removed from the first sleeve.

It is often advantageous to make the opening in the outer casing at the location giving the easiest access to the first exhaust aftertreatment component when still present in the first sleeve. As mentioned above, the outer casing forms the housing of the EATS and typically comprises the side wall, the front end cover and the rear end cover, the rear end cover being located opposite to the front end cover, with the rear end cover being closest to the tailpipe. The piece of the outer casing being cut open may comprise, or consist of, an end cover, or a portion of an end cover, of the exhaust aftertreatment system. It may be beneficial to cut open the end cover being closest to the exhaust aftertreatment component to be replaced. Sometimes it is preferred that the actual cut is made in a side wall of the outer casing adjacent to the end cover, such that the cut can be made through a single wall layer. Thereby, the end cover is still in one part also after removal, e.g. with an inner and an outer end plate holding a layer of insulation in between.

In case step S0 has been performed, the method may further comprise the step of:

S4: Remounting the piece cut open in step S0 at the outer casing of the exhaust aftertreatment system after step S3.

Step S4 may be performed by means of welding.

According to a second aspect of the present invention, there is provided an exhaust aftertreatment system for a vehicle or vessel, the exhaust aftertreatment system comprising a first sleeve extending in an axial direction and a second sleeve located within the first sleeve, the second sleeve containing an exhaust aftertreatment component, wherein an axial direction of the second sleeve coincides with the axial direction of the first sleeve, and wherein the first sleeve and the second sleeve are welded to each other.

The exhaust aftertreatment system of the invention, abbreviated as EATS, is obtainable by means of the method according to the invention described herein. The exhaust aftertreatment component contained in the second sleeve thereby corresponds to the second exhaust aftertreatment component mentioned when describing the method herein. The details described herein in conjunction with the method are valid for the EATS according to the invention as well. Examples of such details are:

- The second sleeve may contain two or more exhaust aftertreatment components.
- A support may be located between the first sleeve and the second sleeve.
- A circumference of the first sleeve may be adapted to circumference of the second sleeve at the corresponding location, e.g. at or adjacent to an end thereof.
- A mounting mat may be positioned between the second exhaust aftertreatment component and the second sleeve.

According to a third aspect of the present invention, there is a vehicle or vessel comprising the exhaust aftertreatment system as described herein.

Effects and features of the second and third aspects of the invention are largely analogous to those described above in connection with the first aspect. The systems, components, parts, vehicles and vessels described above in conjunction with the first aspect will not be described again.

Further advantages and advantageous features of the invention are disclosed in the following description and in the dependent claims.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

With reference to the appended drawings, below follows a more detailed description of embodiments of the invention cited as examples.

DETAILED DESCRIPTION OF EXAMPLE EMBODIMENTS OF THE INVENTION

The present invention will now be described more fully with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The same reference characters refer to the same elements throughout the description.

Figure 1:
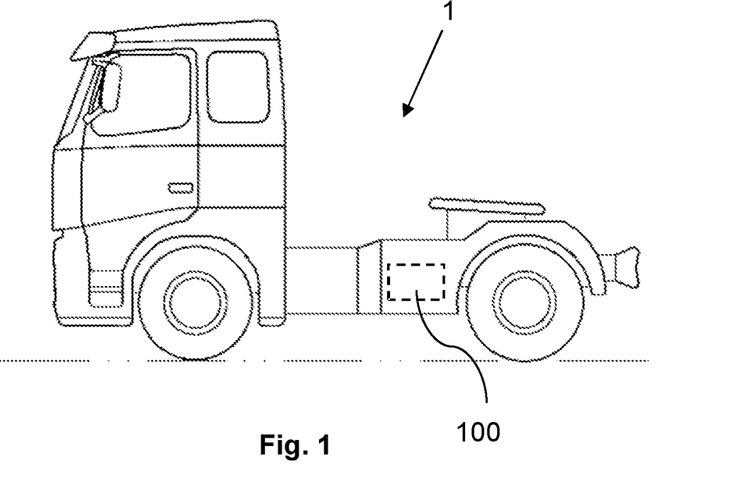
FIG. 1 is a side view of a vehicle in the form a truck according to an embodiment of the invention.

A vehicle 1 according to the invention, illustrated in the form of a truck, is schematically shown in FIG. 1. The vehicle 1 includes an internal combustion engine (not shown) for propulsion of the vehicle 1, and an exhaust system 100 for guiding and handling exhaust gases generated by the internal combustion engine.

Figure 2:
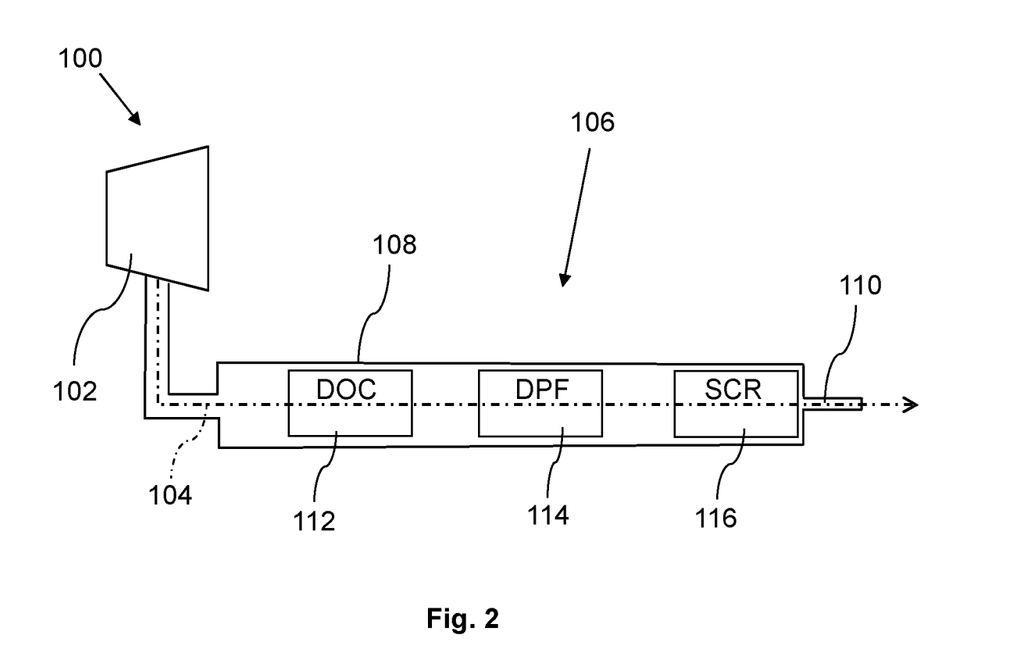
FIG. 2 schematically illustrates components of an exhaust system comprising an exhaust aftertreatment system according to the invention.

An exemplary exhaust system 100, which may be comprised in a vehicle 1 or vessel according to the invention, is schematically illustrated in FIG. 2, showing the exhaust system 100 during operation of the vehicle 1. An exhaust flow path of the exhaust system 100 extends from the engine (not shown), via a turbine of a turbocharger 102, through an exhaust inlet 104 into an exhaust aftertreatment system 106, commonly abbreviated as an EATS, the EATS being delimited by an outer casing 108, and through a tailpipe 110 provided downstream of the EATS 106, via which exhaust gas is emitted. The EATS 106 of the illustrated embodiment comprises three exhaust aftertreatment components 112, 114, 116 configured for treatment of exhaust gases, but it may as well comprise more or fewer components for treatment of exhaust gases. In the shown embodiment, the components 112, 114, 116 are a Diesel Oxidation catalyst substrate 112, abbreviated as DOC, a Particulate Filter substrate in the form of a Diesel Particulate Filter substrate 114, abbreviated as DPF, and a Selective Catalytic Reduction substrate 116, abbreviated as SCR, respectively. Furthermore, as an option and not illustrated in FIG. 2, there may be additional components, e.g. sensors, such as one or more temperature sensors, and/or an optional urea injector. During operation of the combustion engine, the exhaust gas follows the exhaust flow path through the EATS 106, passing via the components 112, 114, 116, as illustrated in FIG. 2. The optional sensors may thereby continuously or intermittently monitor the exhaust system 100.

The EATS 106 shown as part of the exhaust system 100 of FIG. 2 illustrates an exhaust aftertreatment system according to the invention. Details of it are further described below in conjunction with FIG. 4-9. The EATS 106 may be comprised in a vehicle 1 or vessel according to the invention.

Figure 3:
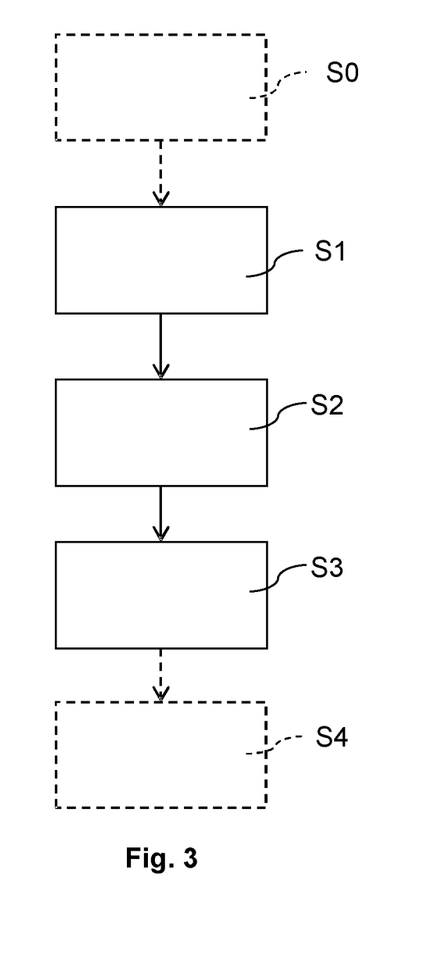
FIG. 3 schematically illustrates a flowchart of operational steps S0-S4 of a method, according to the invention.

A method according to an embodiment of the invention for replacing an exhaust aftertreatment component 112, 114, 116 of an exhaust aftertreatment system 106 of a vehicle 1 or vessel, e.g. the one shown in FIG. 2, is illustrated in the flow chart of FIG. 3. Dashed boxes illustrate optional steps.

The exhaust aftertreatment system 106 is delimited by the outer casing 108 and comprises a first sleeve, which extends in an axial direction and contains a first exhaust aftertreatment component mounted directly in the first sleeve. The method according to the invention is suitably performed in the exhaust aftertreatment system according to the invention, e.g. in the EATS 106 illustrated in FIG. 2. The method comprises the following steps:

S1: Removing the first exhaust aftertreatment component from the first sleeve, the first sleeve thereby remaining intact within the outer casing.

S2: Providing a second exhaust aftertreatment component being mounted in a second sleeve, the second sleeve being configured to fit within the first sleeve.

S3: Mounting the second sleeve with the second exhaust aftertreatment component in the first sleeve by inserting the second sleeve into the first sleeve in the axial direction thereof.

Steps S1 and S2 may be performed in any order, after each other and/or at least partly in parallel. Step S2 may be performed fully separate from step S1, e.g. at another location and/or at another point of time. Step S3 is performed after steps S1 and S2.

The method may further comprise:

S0: Cutting open a piece of the outer casing of the exhaust aftertreatment system to allow access to the exhaust aftertreatment component contained in the first sleeve.

This step is performed before step S1 to allow access to the exhaust aftertreatment component in step S1.

In case step S0 has been performed, the method may further comprise the step of:

S4: Remounting the piece cut open in step S0 at the outer casing of the exhaust aftertreatment system after step S3.

Step S4 may be performed by means of welding.

These steps are described in more detail below with the help of FIGS. 4a-9b. In these figures the reference numbers of FIG. 2 will be re-used for components only shown schematically in FIG. 2.

Figure 4A:
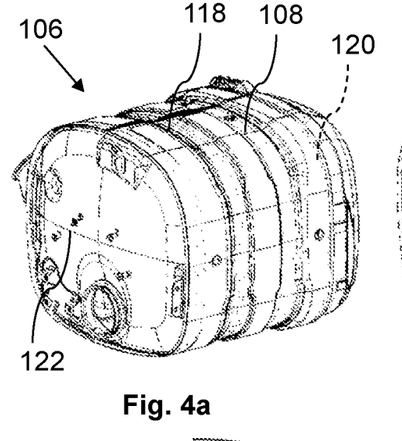
FIG. 4a-b illustrate an exhaust aftertreatment system, when performing step S0 by removing an end cover of the outer housing.
Figure 4B:
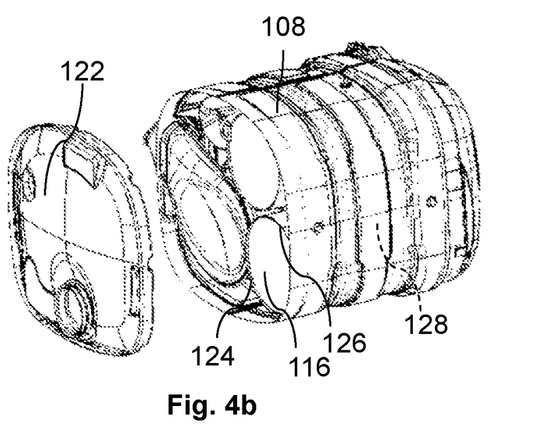

FIGS. 4a and 4b illustrate the exemplary actions taken in step S0. The outer casing 108 forms a housing of the exhaust aftertreatment system 106 according to the invention. It comprises a side wall 118, a front end cover 120 and a rear end cover 122. The rear end cover 122 is located opposite to the front end cover 120, with the rear end cover 122 being closest to the tailpipe 110; hence the terms front and rear relate to the flow direction of the exhaust gas with front being on the inlet side and rear on the outlet side. In order to be able to access an interior of the exhaust aftertreatment system 106, a piece of the outer casing 108 is cut open, e.g. one of the end covers 120, 122. It is usually beneficial to cut open the end cover being closest to the exhaust aftertreatment component to be replaced.

In the embodiment illustrated in FIGS. 4a and 4b, the rear end cover 122 is cut open, which gives a more easy access to the first exhaust aftertreatment component, which is to be replaced, than if cutting open the front end cover 120. Sometimes, as illustrated in FIGS. 4a and 4b, it is preferred that the actual cut is made in the side wall 118 of the outer casing 108 adjacent to the end cover 120, 122, such that the cut can be made through a single wall layer. Thereby, the end cover 120, 122 is still in one part also after removal, e.g. with an inner and an outer end plate holding a layer of insulation in between. Instead of cutting open the whole end cover 120, 122, it may be sufficient to only open a piece of the end cover 120, 122. Alternatively, a piece of the side wall 118 may be cut open. It is often advantageous to make the opening in the outer casing 108 giving the easiest access to the first exhaust aftertreatment component 116, when still present in the first sleeve 124.

In the embodiment of FIGS. 4a and 4b the first exhaust aftertreatment component, which is to be replaced, is exemplified as the SCR 116, but the method would be applicable also for other exhaust aftertreatment components such as for the DOC 112 or the DPF 114. The first exhaust aftertreatment component, which is to be replaced, is contained in a first sleeve, illustrated as the first sleeve 124 of the SCR 116. The first sleeve 124 extends in an axial direction, from a first end 126 to a second opposite end 128, obscured in the view of FIG. 4b. The first and second ends 126, 128 thereby form opposite openings of the first sleeve 124. The axial direction of the first sleeve 124 often coincides with an axial direction of the EATS, but this is not a must and the method may be performed for a first sleeve having an arbitrary orientation in relation to the axial direction of the EATS. In the illustrated embodiment, the first sleeve 124 has a cylindrical geometry and thus a circular cross-sectional shape, but other geometries are feasible, such as an oval or elliptic cross-sectional shape.

Figure 5A:
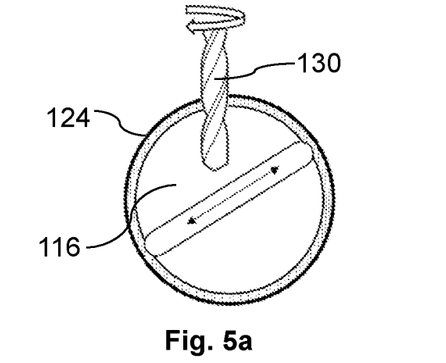
FIG. 5a-b illustrate step S1 showing removal of a first exhaust aftertreatment component from a first sleeve.
Figure 5B:
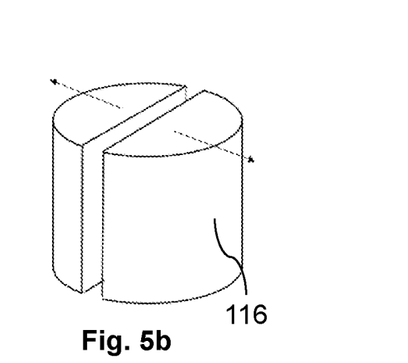

In the illustrated embodiment, step S1 is performed by cutting the first exhaust aftertreatment component, i.e. the SCR 116, in pieces, illustrated as halves, when the SCR 116 is still located in the first sleeve 124, see FIGS. 5a and 5b. The cutting is made in a way leaving the first sleeve 124 intact, e.g. by means of a rotating milling tool 130. The first exhaust aftertreatment component, i.e. the SCR 116, is removed in the axial direction from the first sleeve 124, i.e. through one of the ends 126, 128, such that the first sleeve 124 remains intact after removal of the first exhaust aftertreatment component 116. Further, the first sleeve 124 remains in it existing position in the EATS 106, i.e. inside the outer casing 108.

Figure 6A:
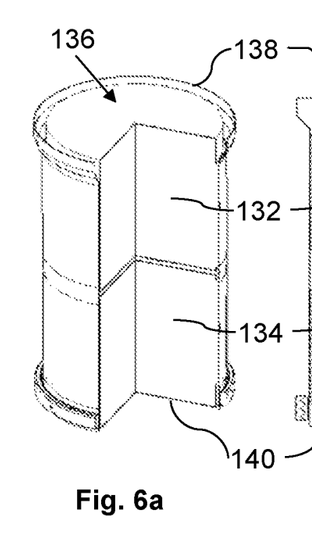
FIG. 6a-c illustrate a second exhaust aftertreatment component being mounted in a second sleeve, cf. step S2.
Figures 6B, 6C:
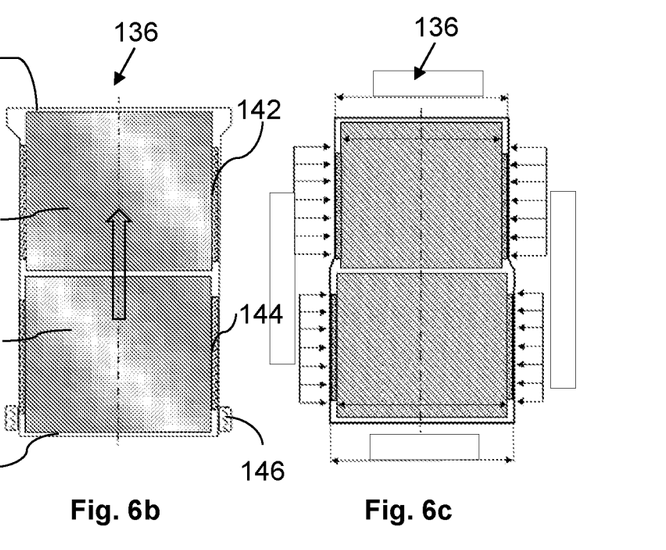

FIGS. 6a-6c illustrate step S2. In the illustrated embodiment, two second exhaust aftertreatment components 132, 134 are mounted in a second sleeve 136, axially in relation to each other. Also the second sleeve 136 extends in an axial direction from a first end 138 to a second opposite end 140. The second sleeve 136 is adapted to fit within the first sleeve 124. The second sleeve 136 thus has a smaller diameter than the first sleeve 124. Even if FIGS. 6a-6c illustrate the case of two second after exhaust aftertreatment components 132, 134, the method is equally applicable for a single second after exhaust aftertreatment component or for a higher number than two. Normally the number of second after exhaust aftertreatment components 132, 134 corresponds to the number of first exhaust aftertreatment components removed in step S1.

As is best seen in FIG. 6b, a respective mounting mat 142, 144 is located between the respective second exhaust aftertreatment component 132, 134 and the second sleeve 136. The mounting mat 142, 144 is made of a resilient material and fills a respective gap between the second exhaust aftertreatment component 132, 134 and the second sleeve 136. Further, a support 146 is provided on the outside of the second sleeve 136. The support 146 is in the illustrated embodiment constituted by a gasket, such as a wire mesh gasket. It is positioned adjacent to the second end 140 of the second sleeve 136, see FIGS. 6a and 6b. The arrow in FIG. 6b schematically indicates the flow direction of the exhaust gas, which coincides with the axial direction.

The method has the advantage that it works also when the two or more second exhaust aftertreatment components 132, 134 have different cross-sectional dimensions, such as different diameters, since the circumference of the second sleeve 136 can be adapted locally to the respective second exhaust aftertreatment component 132, 134, so called adaptive canning of the second sleeve 136, see FIG. 6c. This adaptation is made before inserting the second sleeve 136 into the first sleeve 124.

Figures 7A, 7B, 8:
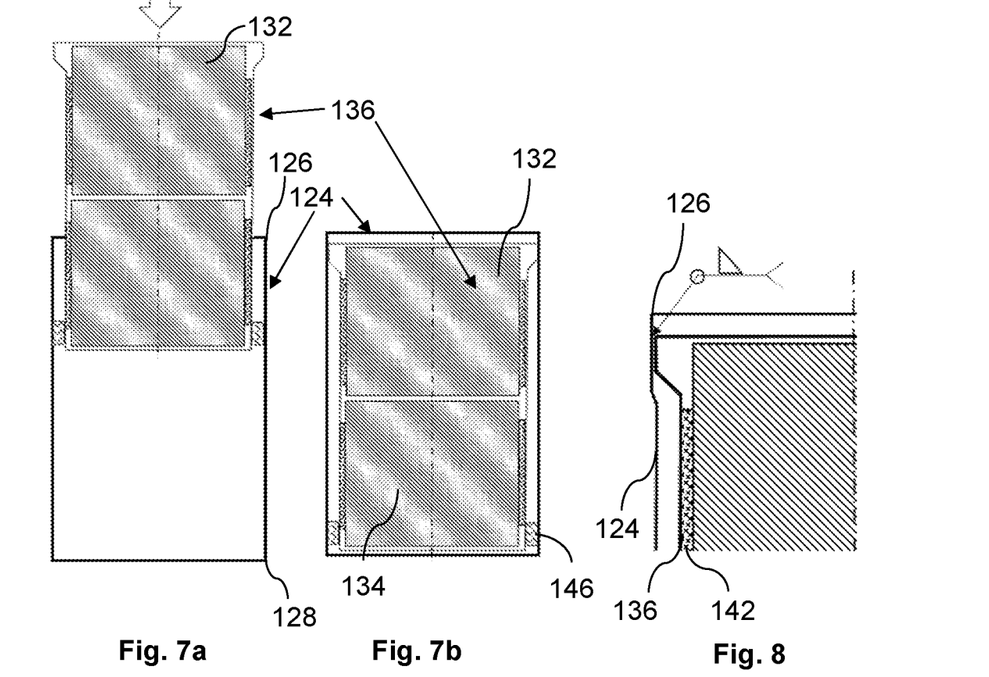
FIG. 7a-b illustrate step S3 showing mounting of the second sleeve in the first sleeve.
FIG. 8 illustrates adapting diameters of the first and second sleeves.

FIG. 7a illustrates when the second sleeve 136 is inserted into the first sleeve 124 in the axial direction of the first sleeve 124. Hence, the axial directions of the respective sleeve 124, 136 coincide. The second sleeve 136 is inserted via one of the ends 126, 128 of the first sleeve 124. After insertion, the support 146 is located between the first sleeve 124 and the second sleeve 136, see FIG. 7b. The support 146 reduces, or preferably avoids, the risk of the second sleeve 136 vibrating or moving in any other way in the first sleeve 124. The support 146 also has a sealing function, preventing, or at least reducing the risk of, exhaust gas slipping through in the gap between the first sleeve 124 and the second sleeve 136, i.e. without passing the second exhaust aftertreatment components 132, 134.

Step S3 may comprise adapting a circumference of the first sleeve 124 at or adjacent to an end to a circumference of the second sleeve 136 at the corresponding location. Typically this is done at or adjacent to the first end 126, i.e. the end through which the second sleeve 136 is inserted, see FIG. 8. Thereby a desired fit between the first sleeve 124 and the second sleeve 136 may be obtained. The adaptation of the circumference may be used to facilitate welding of the second sleeve 136 to the first sleeve 124, e.g. by locally minimizing the gap between the first 124 and the second sleeve 136. The weld between the first sleeve 124 and second sleeve 136 prevents, or at least reduces the risk of, exhaust gas slipping through in the gap between the first sleeve 124 and the second sleeve 136, i.e. without passing the second exhaust aftertreatment component 132, 134.

Figure 9A:
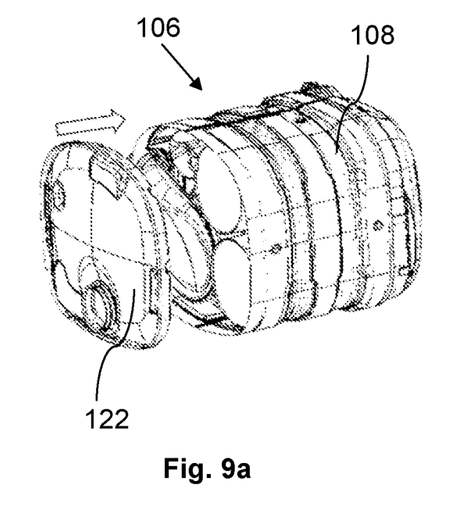
FIG. 9a-b illustrate step S4 showing remounting the end cover at the outer casing.
Figure 9B:
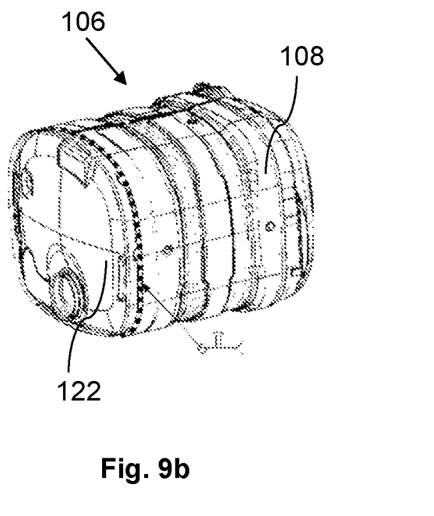

Finally, after step S3 is performed, the piece cut open in step S0, illustrated as the rear end cover 122 is remounted at the outer casing 108 of the EATS 106, see FIGS. 9a and 9b. The remounting may comprise welding the rear end cover 122 to the rest of the outer casing 108.

It is to be understood that the present invention is not limited to the embodiments described above and illustrated in the drawings; rather, the skilled person will recognize that many changes and modifications may be made within the scope of the appended claims, the EATS may have many different configurations, with the first exhaust treatment components mounted in different orders and numbers.

The invention claimed is:

1. A method for replacing an exhaust aftertreatment component of an exhaust aftertreatment system in a vehicle or vessel, the exhaust aftertreatment system being delimited by an outer casing, the exhaust aftertreatment system comprising a first sleeve containing a first exhaust aftertreatment component mounted directly in the first sleeve, the first sleeve extending in an axial direction, the method comprising the steps of:

S1: removing the first exhaust aftertreatment component from the first sleeve, the first sleeve thereby remaining intact within the outer casing, S2: providing a second exhaust aftertreatment component being mounted in a second sleeve, the second sleeve being configured to fit within the first sleeve, and S3: mounting the second sleeve with the second exhaust aftertreatment component in the first sleeve by inserting the second sleeve into the first sleeve in the axial direction thereof.

2. The method according to claim 1, wherein step S1 comprises cutting the first exhaust aftertreatment component in pieces, such as halves, when located in the first sleeve.

3. The method according to claim 1, wherein a mounting mat is positioned between the second exhaust aftertreatment component and the second sleeve.

4. The method according to claim 1, wherein two or more second exhaust aftertreatment components are mounted in the second sleeve.

5. The method according to claim 1, wherein step S3 comprises positioning a support between the first sleeve and the second sleeve.

6. The method according to claim 1, wherein step S3 comprises welding the second sleeve to the first sleeve.

7. The method according to claim 1, wherein step S3 comprises adapting a circumference of the first sleeve at or adjacent to an end thereof to a circumference of the second sleeve at the corresponding location.

8. The method according to claim 1, wherein the method further comprises the step of:
   S0: Cutting open a piece of the outer casing of the exhaust aftertreatment system to allow access to the first aftertreatment component contained in the first sleeve.

9. The method according to claim 8, wherein the piece of the outer casing being cut open comprises, or consists of, an end cover, or a portion of an end cover, of the exhaust aftertreatment system.

10. The method according to claim 8, wherein the method further comprises the step of:
    S4: Remounting the piece cut open in step S0 at the outer casing of the exhaust aftertreatment system after step S3.

11. An exhaust aftertreatment system for a vehicle or vessel, the exhaust aftertreatment system comprising
    a first sleeve, extending in an axial direction, and
    a second sleeve located within the first sleeve, the second sleeve containing two or more exhaust aftertreatment components entirely contained within the second sleeve,
    wherein an axial direction of the second sleeve coincides with the axial direction of the first sleeve, and
    wherein the first sleeve and the second sleeve are welded to each other.

12. The exhaust aftertreatment system according to claim 11 wherein a support is located between the first sleeve and the second sleeve.

13. The exhaust aftertreatment system according to claim 11, wherein a circumference of the first sleeve at or adjacent to an end thereof is adapted to a circumference of the second sleeve at the corresponding location.

14. A vehicle or vessel comprising the exhaust aftertreatment system according to claim 11.

* * * * *